United States Patent
Shin et al.

(10) Patent No.: US 7,356,386 B2
(45) Date of Patent: Apr. 8, 2008

(54) METHOD FOR REDUCING INSTANTANEOUS CURRENT ON STARTUP

(75) Inventors: Wh Shin, Taipei (TW); Chao-Huang Chang, Taipei (TW); Min-Tsung Huang, Taipei (TW)

(73) Assignee: Inventec Corporation (TW)

( * ) Notice: Subject to any disclaimer, the term of this patent is extended or adjusted under 35 U.S.C. 154(b) by 37 days.

(21) Appl. No.: 11/395,971

(22) Filed: Mar. 30, 2006

(65) Prior Publication Data

US 2007/0112472 A1    May 17, 2007

(30) Foreign Application Priority Data

Nov. 16, 2005    (TW) .............................. 94140209 A

(51) Int. Cl.
*G06F 19/00* (2006.01)

(52) U.S. Cl. .................. 700/300; 318/254; 361/676; 702/132; 713/330

(58) Field of Classification Search ............... 700/299, 700/300; 361/676; 318/254; 320/101; 702/132; 713/330
See application file for complete search history.

(56) References Cited

U.S. PATENT DOCUMENTS

| 6,611,117 | B1 * | 8/2003 | Hardt ..................... 318/254 |
| 7,152,013 | B2 * | 12/2006 | Chang et al. ............ 702/132 |
| 2004/0217732 | A1 * | 11/2004 | Zhu et al. ............... 320/101 |
| 2006/0152891 | A1 * | 7/2006 | Jreij et al. .............. 361/676 |

* cited by examiner

*Primary Examiner*—Leo Picard
*Assistant Examiner*—Douglas S Lee
(74) *Attorney, Agent, or Firm*—Peter F. Corless; Steven M. Jensen; Edwards Angell Palmer & Dodge LLP

(57) ABSTRACT

A method for reducing instantaneous current on startup is applicable to an electronic device with a management controller. The management controller is electrically connected to a startup processing module of the electronic device such that operations of fans equipped in the electronic device can be controlled via this electrical connection relationship. When the electronic device is turned on, operations of the fans in the electronic device are disabled by the startup processing module. Then, when power is detected by the management controller, the smallest amount of current possible for operations of the fans for heat-dissipating purpose is generated by the management controller. Finally, hardware components in the electronic device are initialized by the management controller. The above method solves the problem of system instability due to large instantaneous current on startup in the prior art.

4 Claims, 1 Drawing Sheet

METHOD FOR REDUCING INSTANTANEOUS CURRENT ON STARTUP

FIELD OF THE INVENTION

The present invention relates to a method for reducing instantaneous current on startup, and more particularly, to an electronic device with a management controller for reducing instantaneous on startup.

BACKGROUND OF THE INVENTION

Normally, if computers are divided according to their application levels, there are Personal Computers (PCs), server work stations and super computers. A PC usually employs one to two processors responsible for processing daily routines and multimedia. For operations that require more complicated computations, such as computations of 3-D computer graphics, work stations are widely used for handling these operations. Most servers on the market have two to four processors to accommodate network needs, but server systems with 8 to 16 processors are not uncommon for some specialized applications. For even more specialized purposes that demand very high computation efficiency, such as nuclear weapon simulation, metrological applications, gene engineering etc., super computers are formed with tens, hundreds or even thousands of processors (or sub-computer systems).

Along with the advancement of semiconductor processes, current chipsets (e.g. Central Processing Unit) have evolved from micron-level to nano-level, and usually contain hundreds and millions of transistors generating enormous amount of heat during operation. If generated heat cannot be dissipated properly, internal temperature of the computers will cause the system surrounding temperature to be too high and degrade system stability, even cause abnormal situations to occur such as a computer crash.

In the prior art, fans are usually provided to cause convection phenomenon so as to dissipate beat. Since the fans can effectively lower internal temperature of the devices and are relatively cheap to make, they are widely used. However, the shortcoming of this approach is that: when an electronic device (e.g. a server) is turned on, all of the hardware components in the device are running at full speed, thus all the fans equipped in the device will also be running simultaneously, which may cause instantaneous current to be too high on startup. Accordingly, system instability, loud noise or even abnormal situations, such as a computer crash, may occur. This problem is more severe for highly efficient servers equipped with many fans.

Therefore, there is a need to solve deficiencies such as high instantaneous current and loud noise on server startup.

SUMMARY OF THE INVENTION

In the light of forgoing drawbacks, an objective of the present invention is to provide a method for reducing instantaneous current on startup to enhance system stability.

Another objective of the present invention is to provide a method for reducing instantaneous current on startup for reducing loud noise on startup.

In accordance with the above and other objectives, a method for reducing instantaneous current on startup applicable to an electronic device with a management controller is proposed. The management controller is electrically connected to a startup processing module of the electronic device such that operations of fans equipped in the electronic device can be controlled via this electrical connecting relationship. When the electronic device is turned on, the operations of the fans in the electronic device are disabled by the startup processing module. Then, when power is detected by the management controller, the smallest amount of current possible for operations of the fans for heat-dissipating purpose is generated by the management controller. Finally, hardware components in the electronic device are initialized by the management controller. The method for reducing instantaneous current on startup of the present invention solves the problem of system instability due to large instantaneous current on startup in the prior art.

In one embodiment, the management controller is a Baseboard Management Controller (BMC).

In one embodiment, the smallest amount of current possible is the smallest duty cycle possible for the turning speed of the fans set by the management controller at the instant of electronic device startup, and is generated by a Pulse Width Modulation (PWM) controller of the management controller.

In another embodiment, the method further comprises sensing internal temperature of the electronic device to subsequently adjust the speed of the fans.

Therefore, the method for reducing instantaneous current on startup of the present invention adjusts the activating order of the hardware components and the fans, and controls the fans to run at low speed by the management controller based on the predetermined parameter, thereby effectively reduces system instability and loud noise generated when the electronic device is turned on.

BRIEF DESCRIPTION OF THE DRAWINGS

The present invention can be more fully understood by reading the following detailed description of the preferred embodiments, with reference made to the accompanying drawings, wherein.

DETAILED DESCRIPTION OF THE EMBODIMENTS

Figure 1:
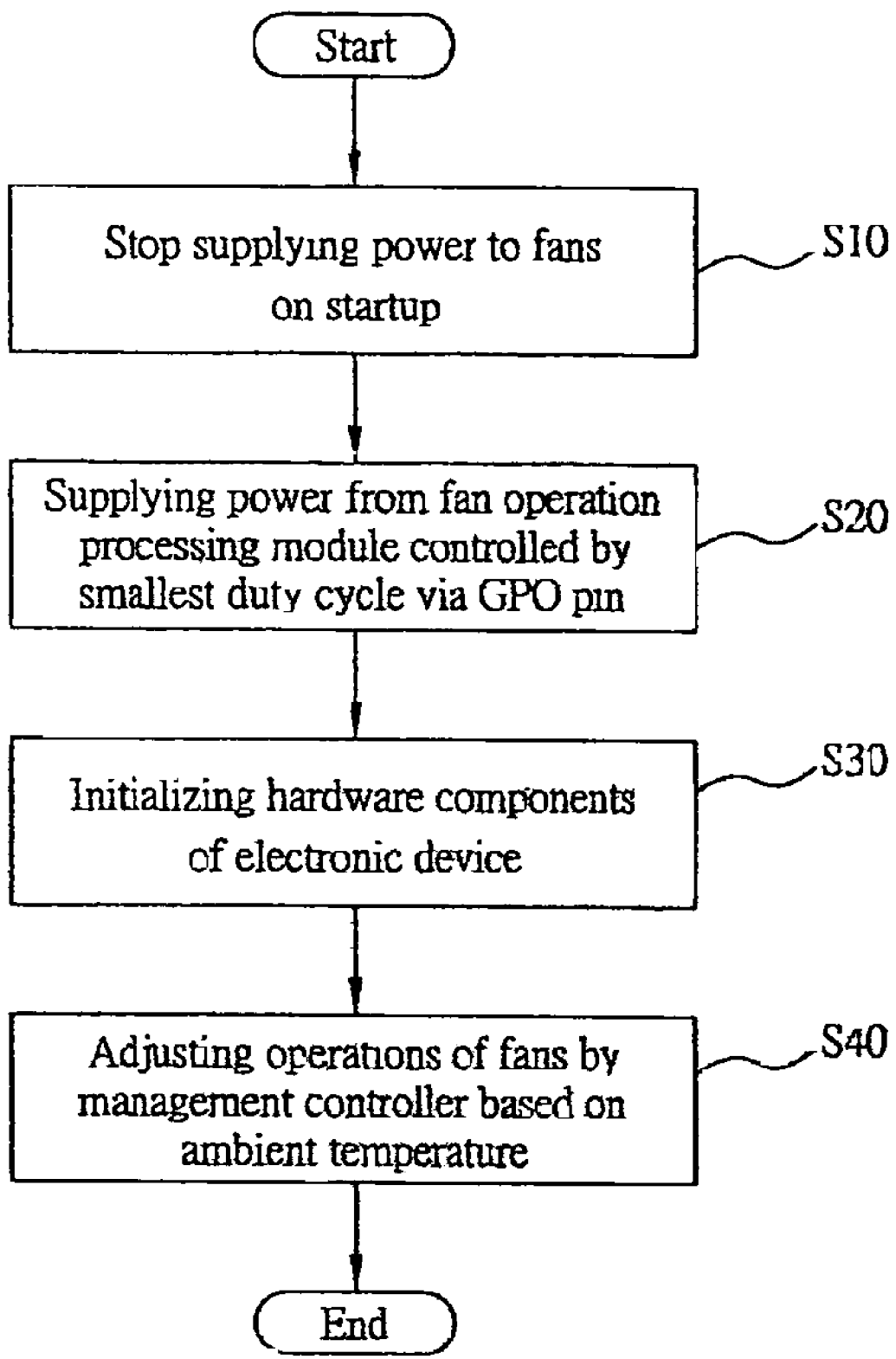
FIG. 1 shows a flowchart of the method for reducing instantaneous current on startup of the present invention.

The present invention is described by the following specific embodiments. Those with ordinary skills in the arts can readily understand the other advantages and functions of the present invention after reading the disclosure of this specification. The present invention can also be implemented with different embodiments. Various details described in this specification can be modified based on different viewpoints and applications without departing from the scope of the present invention.

Referring to FIG. 1, shown is a flowchart of a method for reducing instantaneous current on startup of the present invention. The method is applicable to an electronic device with management controller. In this embodiment, the electronic device is for example a server or a workstation etc. The management controller is for example a Baseboard Management Controller (BMC). A General Port Output (GPO) pin of General Port Input Output (GPIO) pins of the management controller is connected to a startup processing module (e.g. a CPU) of the electronic device in order to control operation of fans when the electronic device is startup via the GPO pin.

As shown in FIG. 1, step S10 is first executed. When the electronic device is turned on, a fan startup processing module stops supplying power to the fans, i.e. the fans are disabled. Then, step S20 is performed.

In step S20, when the management controller detects power is turned on, it generates the smallest possible duty cycle, for example 40%, via a Pulse Width Modulation (PWM) controller for the fans. Power supplied to the fans from the fan operation processing module is controlled by the smallest duty cycle delivered via the GPO pin of the GPIO pins of the management controller. In one embodiment, the power detected by the management controller is a direct current. Then, step S30 is executed.

In step S30, the management controller runs initializing operations to initialize all hardware components of the electronic device so they can perform Power-on self tests (POSTs). Next, step S40 is performed.

In step S40, the management controller senses the internal instantaneous temperature of the electronic device for adjusting speed of the fans, such that heat can be dissipated.

In summary, the method for reducing instantaneous current on startup of the present invention properly adjusts the activating order of the fans and the various hardware component, i.e., at the moment of electronic device startup, the hardware components are first kept in a disabled state, then the fans are activated to run at the lowest speed possible (or alternatively fans are activated in batches), the instantaneous current on startup can be effectively reduced, enhancing system stability and greatly reducing noise produced by the running fans on startup.

The above embodiments are only used to illustrate the principles of the present invention, and they should not be construed as to limit the present invention in any way. The above embodiments can be modified by those with ordinary skills in the arts without departing from the scope of the present invention as defined in the following appended claims.

What is claimed is:

1. A method for reducing instantaneous current on startup, applicable to an electronic device with a baseboard management controller (BMC), the baseboard management controller having general port input output (GPIO) pins, general port output (GPO) pins of the GPIO pins being electrically connected to a central processing unit (CPU) and fans of the electronic device, so as to have the baseboard management controller control operations of the fans equipped in the electronic device after startup through the GPO pins, the method comprising the steps of:

disabling operations of the fans in the electronic device by the CPU when the electronic device is turned on;

generating a smallest amount of current possible for operations of the fans for heat-dissipating purpose through the GPO pins when power is detected by the baseboard management controller; and initializing hardware components in the electronic device by the baseboard management controller, and having the baseboard management controller sense an internal temperature of the electronic device to subsequently adjust a speed at which the fans are running.

2. The method for reducing instantaneous current on startup of claim 1, wherein the smallest amount of current is a smallest duty cycle set by the baseboard management controller at the instant of startup of the electronic device.

3. The method for reducing instantaneous current on startup of claim 2, wherein the smallest duty cycle is forty percent.

4. The method for reducing instantaneous current on startup of claim 2, wherein the smallest amount of current is generated by a Pulse Width Modulation (PWM) controller of the baseboard management controller so that a speed at which the fans are running is controlled by the smallest duty cycle.

* * * * *